United States Patent
Yu et al.

(10) Patent No.: US 8,634,203 B2
(45) Date of Patent: Jan. 21, 2014

(54) LATCH ASSEMBLY FOR CONNECTING TWO BOARDS

(75) Inventors: Chi-An Yu, New Taipei (TW); Yan-Hao Li, Shenzhen (CN); Xing Xia, Shenzhen (CN); Xiao-Ming Zhu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 154 days.

(21) Appl. No.: 13/283,566

(22) Filed: Oct. 27, 2011

(65) Prior Publication Data

US 2013/0084128 A1    Apr. 4, 2013

(30) Foreign Application Priority Data

Sep. 30, 2011  (CN) .......................... 2011 1 0298087

(51) Int. Cl.
    *H05K 1/14*    (2006.01)
(52) U.S. Cl.
    USPC ............................ 361/785; 403/325; 403/327
(58) Field of Classification Search
    USPC ....... 403/322.3, 324, 325, 326, 327, DIG. 10, 403/DIG. 11, DIG. 13, DIG. 14; 292/163, 292/DIG. 37, 164, 138, 150, 302, 341.15; 361/785, 786
    See application file for complete search history.

(56) References Cited

U.S. PATENT DOCUMENTS

| | | | | | |
|---|---|---|---|---|---|
| 742,598 | A | * | 10/1903 | Costello, Jr. et al. | 403/327 |
| 2,190,518 | A | * | 2/1940 | Joyce, Jr. | 292/341.15 |
| 3,403,641 | A | * | 10/1968 | Baker | 108/152 |
| 4,025,216 | A | * | 5/1977 | Hives | 403/DIG. 11 |
| 4,480,862 | A | * | 11/1984 | Fleming | 292/150 |
| 4,752,150 | A | * | 6/1988 | Salice | 403/DIG. 11 |
| 5,518,040 | A | * | 5/1996 | Rupflin | 403/325 |
| 5,818,691 | A | * | 10/1998 | McMahan et al. | 403/327 |
| 7,159,910 | B2 | * | 1/2007 | Hwang | 292/341.15 |

* cited by examiner

*Primary Examiner* — Michael P Ferguson
(74) *Attorney, Agent, or Firm* — Altis Law Group, Inc.

(57) ABSTRACT

A latch assembly for securing two boards together includes a male section and a female section. The male section includes a base to be fixed to one board, a tab protruding from a first side surface of the base. The tab includes at least one latching portion protruding therefrom. The female section includes a support block fixed to the other one board and defining a chamber, a movable block slidably retained within the chamber of the support block, and the at least one elastic member is retained within the chamber. The movable block includes a stop portion capable of latching with the at least one latching portion when the movable block is retained in a securing position by the tab. The at least one elastic member applies a push force to the movable block to movably retain the movable block in the normal position.

12 Claims, 7 Drawing Sheets

LATCH ASSEMBLY FOR CONNECTING TWO BOARDS

BACKGROUND

1. Technical Field

The present disclosure relates to a latch assembly for securing two boards together.

2. Description of Related Art

Surface mount technology (SMT) is a method for constructing electronic circuits on a circuit board. A board for supporting the circuit board is needed during the process. Generally, a number of boards are fastened together with latch assemblies. Although the conventional latch assemblies can satisfy basic requirements, it is always desirable for a new type of latch assembly.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure are now described in detail, with reference to the accompanying drawings.

Figure 1:
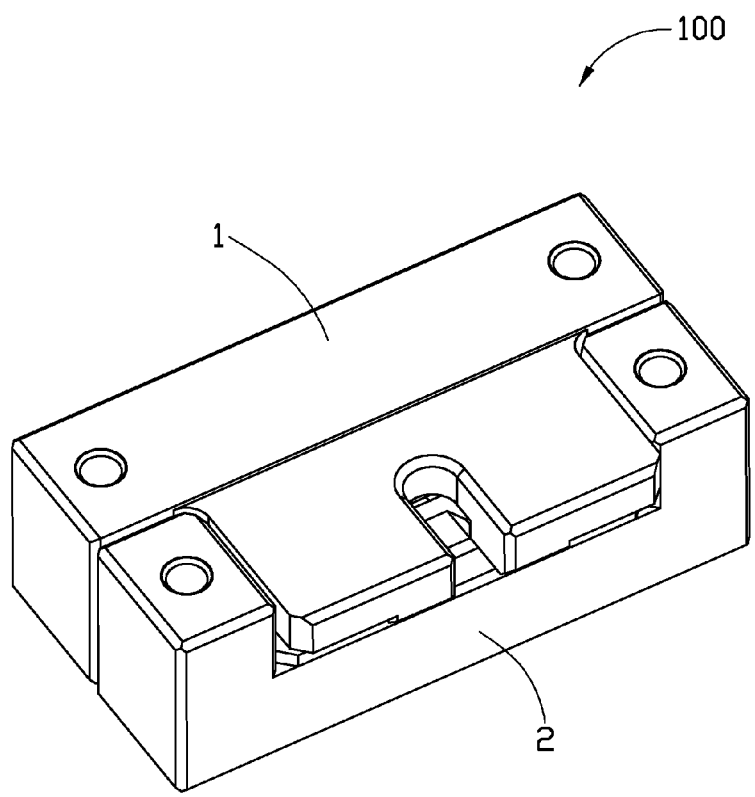
FIG. 1 is an isometric view of a latch assembly according to an exemplary embodiment.
Figure 7:
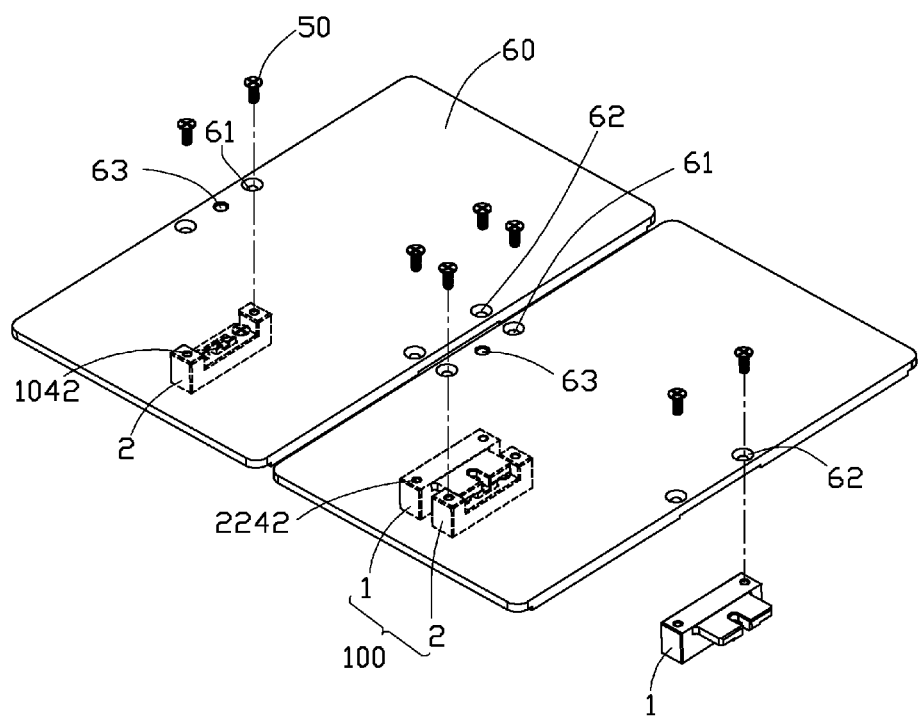
FIG. 7 is an exploded, isometric of two boards and a latch assembly of FIG. 1.

Referring to FIGS. 1 and 7, a latch assembly 100 for securing two boards 60 according to an exemplary embodiment is illustrated. The latch assembly 100 includes a male section 1 and a female section 2 respectively fixed to the two boards 60. Each board 60 defines two first through holes 61 in one side, two second through holes 62 in an opposite side, and a middle hole 63 between the two first through holes 61.

Figure 2:
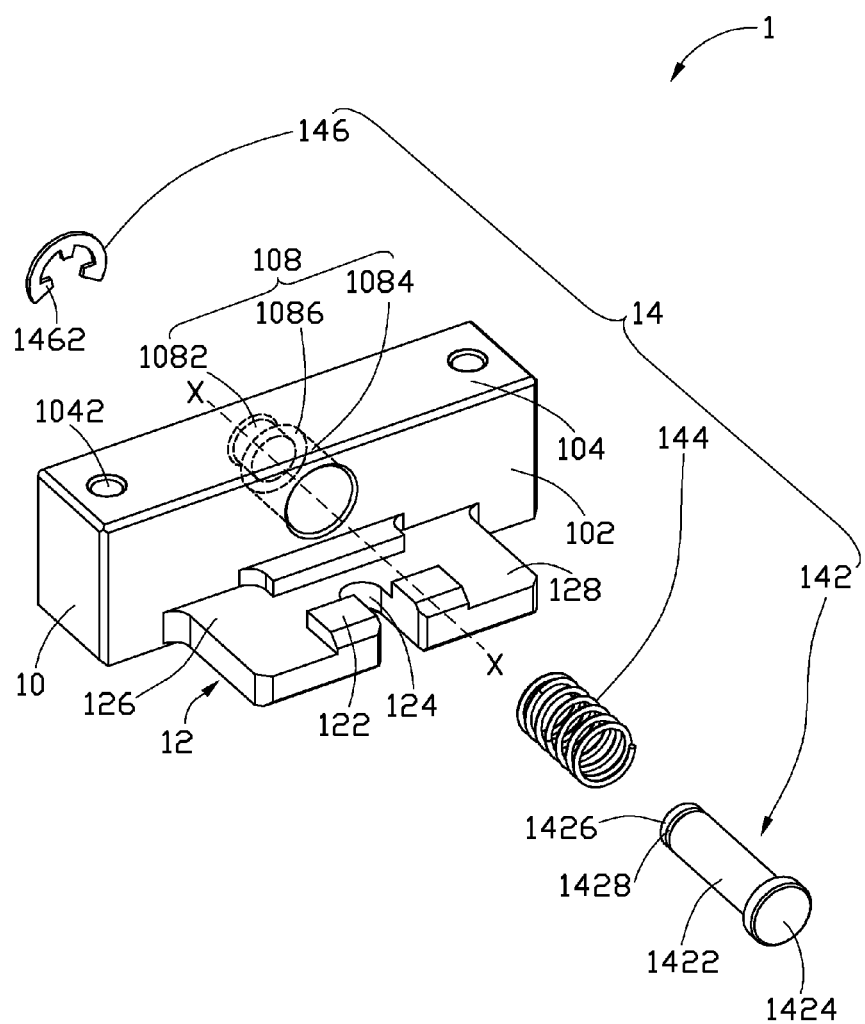
FIG. 2 is an exploded, isometric of a male section of the latch assembly of FIG. 1, viewed from a different perspective.
Figure 3:
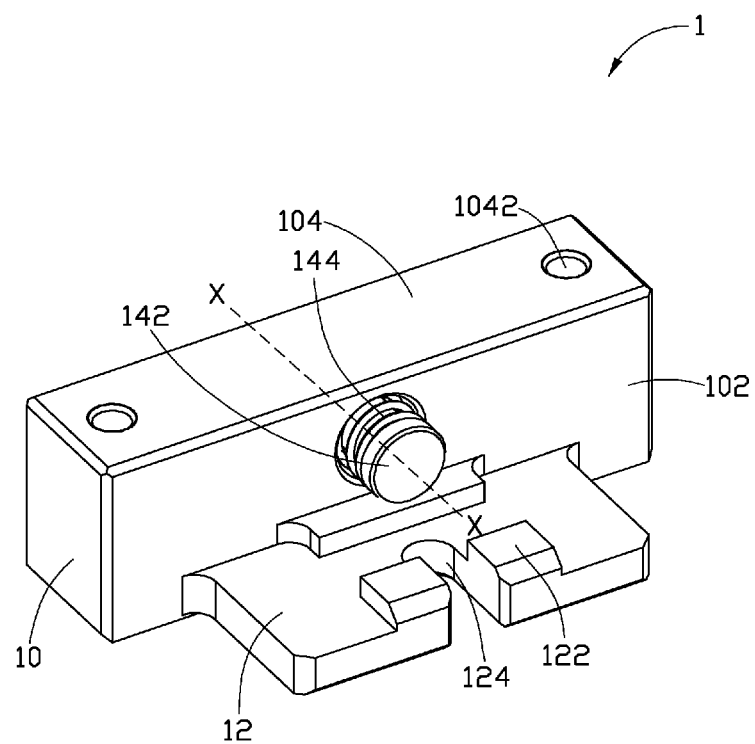
FIG. 3 is an assembled, isometric view of the male section of FIG. 2.

Referring to FIGS. 2-3, the male section 1 includes a base 10, a tab 12 protruding from one side of the base 10, and an ejection mechanism 14 for pushing the female section 2 away from the male section 1.

The base 10 includes a first side surface 102 where the tab 12 protrudes and a first top surface 104 connected to the first side surface 102. The first top surface 104 defines two first fastening holes 1042 respectively aligned with the first through holes 61 of the board 60. The base 10 further defines a mounting hole 108 in the first side surface 102. The mounting hole 108 is a stepped hole running through the base 10 along a first imaginary line X-X. The mounting hole 108 includes a first hole portion 1082, a second hole portion 1084, and a shoulder 1086 between the first hole portion 1082 and the second hole portion 1084. The diameter of the first hole portion 1082 is less than that of the second hole portion 1084.

The tab 12 includes a second top surface 126 substantially perpendicular to the first side surface 102 and two spaced latching protrusions 122 protruding from the second top surface 126. The tab 12 further defines a U-shaped through furrow 124 between the two latching protrusions 122.

The ejection mechanism 14 includes a rod 142 including one end extending through the mounting hole 108, a resilient member 144, and a locking ring 146 fixed to the end of the rod 142 that extends through the mounting hole 108. The rod 142 includes a head portion 1424, a distal end 1426 opposite the head portion 1424, and a shank 1422 between the head portion 1424 and the distal end 1426. The diameter of the head portion 1424 is greater than that of the distal end 1426. The distal end 1426 extends through the second hole portion 1084 of the mounting hole 108, and the head portion 1424 can be retained within the first hole portion 1082. The distal end 1426 defines an annular groove 1428. The rod 142 can be moved along the center imaginary line X.

The locking ring 146 is C-shaped and includes a number of engaging portions 1462 protruding from an inner edge. The locking ring 146 can be elastically deformed to enlarge the distance between the two engaging portions 1462 at the two ends, allowing the engaging portions 1462 to be received in the annular groove 1428. When rebounding, the locking ring 146 is retained in the groove 1428. The locking ring 146 can prevent the rod 142 from sliding out of the mounting hole 108 of the base 10.

In the embodiment, the resilient member 144 is coiled spring coiled around the shank 1422, with two opposite ends respectively resisting against the connecting surface 1086 of the mounting hole 108 and the head portion 1424. Therefore, the resilient member 144 can provide a push force to the head portion 1424, retaining the rod 142 in a position as shown in FIG. 3.

Figure 4:
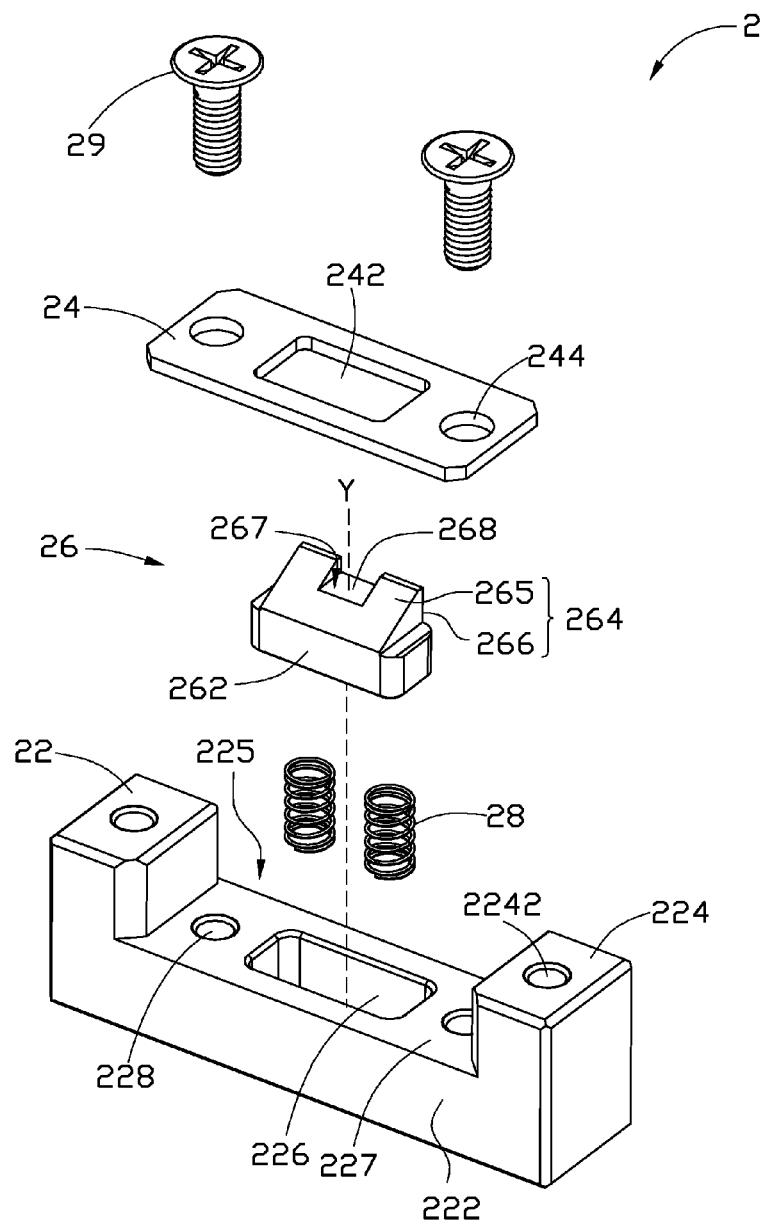
FIG. 4 is an exploded, isometric of a female section of the latch assembly of FIG. 1.
Figure 5:
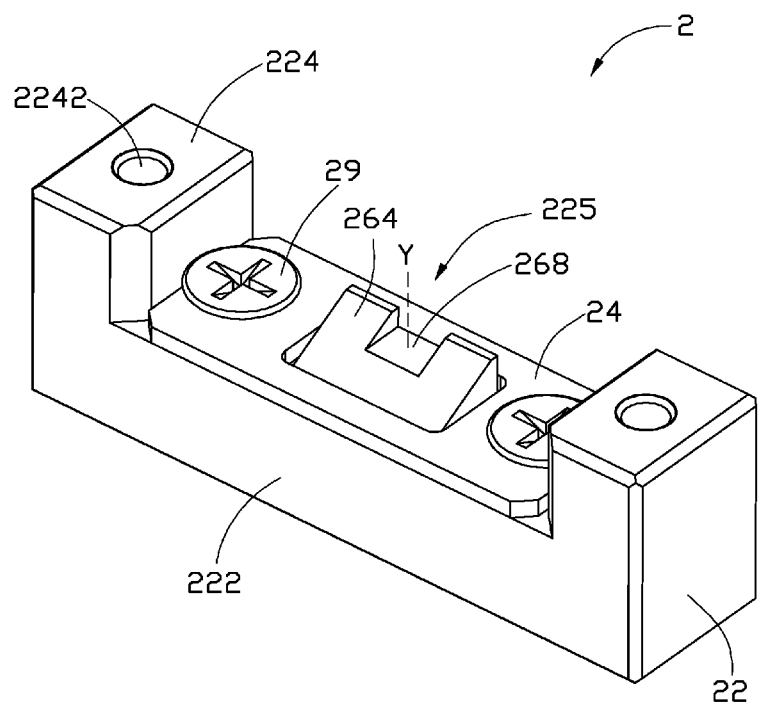
FIG. 5 is an assembled, isometric view of the female section of FIG. 3.

Referring to FIGS. 4-5, the female section 2 includes a support block 22 defining a chamber 226 extending along a second imaginary line Y, a cover plate 24, a movable block 26 slidably retained within the chamber 226, at least one elastic member 28, and two fasteners 29 securing the cover plate 24 to the support block 22.

The support block 22 includes an elongated rectangular body 222 and two side blocks 224 substantially perpendicularly protruding from two opposite ends of the rectangular body 222, which cooperatively define a receiving space 225 for receiving the tab 12. The rectangular body 222 includes a third top surface 227 between the two side blocks 224 where the chamber 226 is formed. The support block 22 further defines two third fastening holes 228 in the third top surface 227 and two second fastening holes 2242 in the side blocks 224.

The cover plate 24 defines an opening 242 communicating with the chamber 226 and two third through holes 244 respectively aligned with the third fastening holes 228. The dimension of the opening 242 is less than that of the chamber 226, such that the movable block 26 is retained in the chamber 226 by the cover plate 24. The fastener 29 extends through the third through hole 244 and is screwed into the third fastening holes 228.

The movable block 26 includes a main body 262 slidably retained within the chamber 226 and a stop portion 264 protruding from the main body 262. In the embodiment, the stop portion 264 is a triangle prism and includes a first surface 265 tilted toward the main body 262 and an opposite second surface 266 substantially perpendicular to the main body 262. The stop portion 264 defines a notch 267 extending from the first surface 265 to the second surface 266. The notch 267 includes a third surface 268 parallel to the main body 262.

The at least one elastic member 28 is retained within the chamber 226 and abuts against the movable block 26. The at least one elastic member 28 applies a push force to the movable block 26, retaining the stop portion 264 in a securing position by the tab 12 as shown in FIG. 5, where the stop portion 264 extends through the opening 242 of the cover plate 24.

Figure 6:
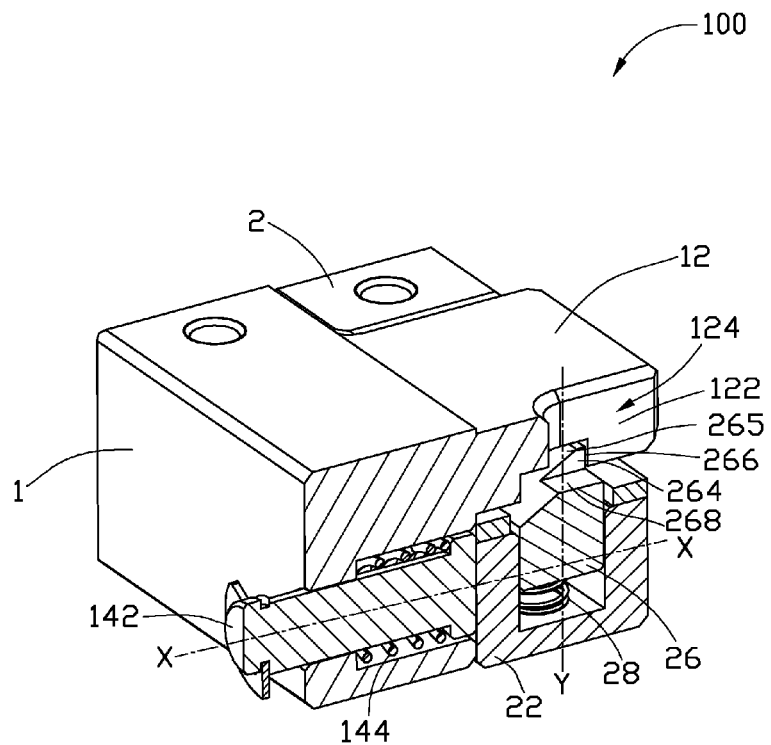
FIG. 6 is a cutaway view of the latch assembly of FIG. 1.

Referring to FIGS. 6-7, in the embodiment, two screws 50 extend through the first through holes 61 of one board 60 and are retained in the first fastening holes 1042 of the male section 1, thereby connecting the male section 1 to the board 60. Another two screws 50 extend through the second through holes 62 of the board 60 and are retained in the third fastening holes 228 of the female section 2 connecting the male section 2 to the other board 60.

When being connected, the two boards 60 are orientated to allow the tab 12 to be inserted into the receiving space 225 of the female section 2. During the insertion, the first tab 12 will press down the stop portion 264 and the at least one elastic member 28 drives the movable block 26 to move upward along the second imaginary line Y after the tab 12 moves over the stop portion 264. The second surface 266 of the movable block 26 then abuts against the latching portion 122, which prevents the female section 2 from detaching from the male section 1, connecting the two boards 60 together. The head portion 1424 of the rod 142 as shown in FIG. 6 compresses the resilient member 144.

When attempting to detach the two boards 60, a tool such as a thin rod (not shown) can be inserted through the middle hole 63 and the through furrow 124 to press the movable block 26, the stop portion 264 then moves downwards along the second imaginary line Y. When the latching portion 122 is out of contact with the stop portion 264, the resilient member 144 drives the rod 142 to push the female section 2 away from the male section 1 along the first imaginary line X, until the tab 12 moves out of the receiving space 225 of the female section 2. The two boards 60 can thus be detached from each other.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A latch assembly for securing a first board and a second board together, comprising:
    a male section comprising:
    a base to be fixed to the first board and comprising a first side surface, the first side surface defining a mounting hole extending along a first imaginary line, wherein the mounting hole comprises a first hole portion, a second hole portion, and a shoulder between the first hole portion and the second hole portion; and
    a tab protruding from the first side surface of the base, the tab comprising at least one latching portion protruding therefrom;
    a female section comprising:
    a support block to be fixed to the second board and defining a chamber extending along a second imaginary line, the second imaginary line being substantially perpendicular to the first imaginary line;
    a movable block slidably retained within the chamber of the support block and slidable along the second imaginary line, the movable block comprising a stop portion capable of latching with the at least one latching portion when the movable block is retained in a securing position by the tab; and
    at least one elastic member retained within the chamber to apply a push force to the movable block to movably retain the movable block in the securing position;
    wherein the tab defines a through furrow thereby allowing an external tool to be inserted through the through furrow to press the movable block to release the stop portion from the latching portion; and
    an ejection mechanism comprising a rod and a coil spring, the rod extending through mounted in the mounting hole and slidable along the first imaginary line, the rod comprising a head portion, a distal end away from the head portion, and a shank between the head portion and the distal end, the coiled spring coiled around the shank with two opposite ends respectively resisting the shoulder and the head portion, and the ejection mechanism being elastic and compressible between the male section and the female section for pushing the female section away from the male section when the latching portion is released from the stop portion.

2. The latch assembly as described in claim 1, wherein the female section further comprises a cover plate fixed to the support block and defining an opening communicating with the chamber, the stop portion of the movable block extending through the opening for latching with the at least one latching portion, and the cover plate prevents the movable block from sliding out of the chamber.

3. The latch assembly as described in claim 1, wherein the base comprises a first top surface defining a plurality of first fastening holes allowing a plurality of screws to extend through the first board and be screwed into the base, thereby fixing the base to the first board.

4. The latch assembly as described in claim 1, wherein the support block comprises a rectangular body and two side blocks protruding substantially perpendicularly from two opposite ends of the rectangular body, which cooperatively define a receiving space facing the second board therebetween for receiving the tab of the male section.

5. The latch assembly as described in claim 4, wherein the support block defines a plurality of second fastening holes in the side blocks allowing a plurality of screws to extend through the second board and be screwed into the support block, thereby fixing the support block to the second board.

6. The latch assembly as described in claim 1, wherein the movable block comprises a main body slidably retained within the chamber, and the stop portion protrudes from the main body, and comprises a first surface tilted toward the main body and an opposite second surface substantially perpendicular to the main body.

7. The latch assembly as described in claim 6, wherein the movable block defines a notch on the first surface and communicating with the through furrow when the tab latches with the movable block.

8. The latch assembly as described in claim 7, wherein the movable block comprises a third surface parallel to the main body on a bottom of the notch.

9. The latch assembly as described in claim 1, wherein the ejection mechanism further comprises a locking ring fixed to the end of the rod that extends through the mounting hole, thereby preventing the rod from sliding out of the mounting hole.

10. An assembly comprising:
    a first board;
    a second board; and
    a latching assembly comprising:

a male section comprising:
  a base fixed to the first board and comprising a first side surface, the first side surface defining a mounting hole extending along a first imaginary line, wherein the mounting hole comprises a first hole portion, a second hole portion, and a shoulder between the first hole portion and the second hole portion; and
  a tab protruding from the first side surface of the base, the tab comprising at least one latching portion protruding therefrom;
a female section comprising:
  a support block fixed to the second board and defining a chamber extending along a second imaginary line, the second imaginary line being substantially perpendicular to the first imaginary line;
  a movable block slidably retained within the chamber of the support block and slidable along the second imaginary line, the movable block comprising a stop portion capable of latching with the at least one latching portion when the movable block is retained in a securing position by the tab; and
  at least one elastic member retained within the chamber to apply a push force to the movable block to movably retain the movable block in the securing position;
  wherein the tab defines a through furrow, and the second board defines a middle hole facing the through furrow, thereby allowing an external tool to be inserted through the middle hole and the through furrow to press the movable block to release the stop portion from the latching portion; and
  an ejection mechanism comprising a rod and a coil spring, the rod extending through mounted in the mounting hole and slidable along the first imaginary line, the rod comprising a head portion, a distal end away from the head portion, and a shank between the head portion and the distal end, the coiled spring coiled around the shank with two opposite ends respectively resisting the shoulder and the head portion, and the ejection mechanism being elastic and compressible between the male section and the female section for pushing the female section away from the male section when the latching portion is released from the stop portion.

11. The assembly as described in claim 10, wherein the ejection mechanism further comprises a locking ring fixed to the end of the rod that extends through the mounting hole, thereby preventing the rod from sliding out of the mounting hole.

12. The assembly as described in claim 10, wherein the movable block comprises a main body slidably retained within the chamber, and the stop portion protrudes from the main body, and comprises a first surface tilted toward the main body and an opposite second surface substantially perpendicular to the main body.

* * * * *